(12) United States Patent
Ronner

(10) Patent No.: US 8,721,831 B2
(45) Date of Patent: May 13, 2014

(54) FASTENING COMPOSITION AND PROCESS FOR FIXING AN ARTICLE TO A SUBSTRATE

(75) Inventor: Christian Ronner, Glarus (CH)

(73) Assignee: Glabete AG, Glarus (CH)

( * ) Notice: Subject to any disclaimer, the term of this patent is extended or adjusted under 35 U.S.C. 154(b) by 550 days.

(21) Appl. No.: 13/000,739

(22) PCT Filed: Mar. 6, 2009

(86) PCT No.: PCT/EP2009/001623
§ 371 (c)(1),
(2), (4) Date: Dec. 22, 2010

(87) PCT Pub. No.: WO2009/156013
PCT Pub. Date: Dec. 30, 2009

(65) Prior Publication Data
US 2011/0100528 A1    May 5, 2011

(30) Foreign Application Priority Data
Jun. 27, 2008    (CH) .......................................... 991/08

(51) Int. Cl.
| E04B 2/00 | (2006.01) |
| E04F 13/00 | (2006.01) |
| A61F 13/15 | (2006.01) |
| B29C 65/00 | (2006.01) |
| B32B 37/00 | (2006.01) |
| C09J 7/02 | (2006.01) |
| C08L 83/00 | (2006.01) |
| C08L 83/04 | (2006.01) |

(52) U.S. Cl.
USPC .............. 156/276; 156/71; 156/329; 524/588

(58) Field of Classification Search
USPC ......... 156/60, 71, 87, 91, 247, 276, 295, 314, 156/325, 326, 327, 329, 701, 714, 718; 524/34, 588
See application file for complete search history.

(56) References Cited

U.S. PATENT DOCUMENTS

| 3,034,944 A | 5/1962 | Chipman | |
| 6,025,445 A * | 2/2000 | Chiba et al. | 525/326.5 |
| 6,124,387 A * | 9/2000 | Wang et al. | 524/315 |

FOREIGN PATENT DOCUMENTS

| DE | 23 65 623 A1 | 8/1975 |
| DE | 10 2007 011511 A1 | 9/2008 |
| DE | 20 2009 003 176 U1 | 8/2010 |

(Continued)

OTHER PUBLICATIONS

Database WPI Week 198916, Thomson Scientific, London, GB; AN 1989-119544, XP002535598.

(Continued)

*Primary Examiner* — Philip Tucker
*Assistant Examiner* — Brian R Slawski
(74) *Attorney, Agent, or Firm* — Venable LLP; Robert Kinberg

(57) ABSTRACT

A fastening composition for attaching two articles, comprising a mixture of an aerobic adhesive and a hydrophilic substance. A process for fixing an article to a substrate, includes the steps of initially preparing a fastening composition by mixing together a hydrophilic substance and an aerobic adhesive; applying a layer of the fastening composition to the article; and subsequently fixing the article to the substrate by pressing the layer of the fastening composition against the substrate. The aerobic adhesive in this layer hardens because of the moisture contained in the hydrophilic substance.

14 Claims, 1 Drawing Sheet

(56) References Cited

FOREIGN PATENT DOCUMENTS

| | | |
|---|---|---|
| JP | 57 14674 A | 1/1982 |
| JP | 01 066279 A | 3/1989 |
| JP | 2006 070181 A | 3/2006 |
| WO | WO-00/37533 A1 | 6/2000 |
| WO | WO-03/036106 | 5/2003 |

OTHER PUBLICATIONS

Database WPI Week 200625, Thomson Scientific, London, GB; AN 2006-234560, XP002535599.

International Search Report issued in International Application PCT/EP2009/001623, dated Jul. 24, 2009.

German Office Action issued in German Application No. 10 2009 023 285.0-43, dated Feb. 10, 2011.

\* cited by examiner

FASTENING COMPOSITION AND PROCESS FOR FIXING AN ARTICLE TO A SUBSTRATE

CROSS-REFERENCE TO RELATED APPLICATIONS

The present application is a U.S. National Stage of International Application No. PCT/EP2009/001623 filed Dec. 30, 2009, designating the United States, which claims priority from Swiss Application No. 991/08 filed on Jun. 27, 2008.

BACKGROUND OF THE INVENTION

The invention relates to a fastening composition and a process for fixing an article to a substrate.

A specific area of application for the process in question, respectively the fastening composition in question, is for attaching articles to the walls of buildings and the like. In particular in bathroom and kitchen areas, the walls are provided with coverings such as different types of tiles, as well as stone slabs or marble slabs. The process, however, relates in general to the most varied areas of application, such as the field of aircraft construction, ship construction and steel construction.

Fastening means in the form of screws, in particular, can be used in a manner known per se to attach equipment items such as pieces of furniture, light fixtures and sanitary equipment fixtures such as towel holders or the like. Bore holes must first be inserted into the walls for this, however, wherein dowels are then inserted into these bore holes. These bore holes are generally worked into the joints between the tiles to prevent damage to the expensive wall coverings consisting of tiles and the like, thereby undesirably limiting the locations for installing the fastening means. In cases where the fastening location for an equipment item must be changed again after some time, it is a further disadvantage that the bore holes are visibly exposed at the old location, thus considerably detracting from the total optical impression of the wall, even if the bore holes are subsequently filled with a filler material.

To avoid these disadvantages, attempts have been made to replace fastening means in the form of screws by using adhesive materials.

In the simplest case, adhesive strips can be used for this, wherein a double-sided adhesive tape is used for the simplest case. One disadvantage encountered with fastening means of this type is that they will detach again over time. A further disadvantage is that no heavy equipment pieces can be attached to the walls with these adhesive strips.

Also conceivable in principle is the use of aerobic adhesives as fastening compositions for attaching articles to substrates, such as to the walls of a room in a building. One problem with this type of use is that said aerobic adhesives must harden for several hours and that moisture must be supplied to the aerobic adhesives. However, if a layer of aerobic adhesive is applied to the article and the article is then pressed together with the layer of aerobic adhesive against the substrate, the layer which is located between the substrate and the article is closed off from the ambient air, so that a hardening of the aerobic adhesive is no longer possible.

A mounting system which permits the use of aerobic adhesives of this type is known from the document WO 03/036106.

This mounting system is used for the stationary attachment of items such as towel holders, shelves, light fixtures or similar equipment pieces on a wall, a ceiling or a similar surface, in particular in rooms where the walls are covered with tiles, marble slabs or similar coverings. The mounting system consists of different types of fastening elements, as well as an adhesive and joining agent which can be an aerobic adhesive. The fastening elements consist of sintered metals for which the shape must be adapted in dependence on the application purpose. These types of systems have the disadvantage of very long hardening times for the adhesive which can take up to 12 hours, thereby considerably reducing the ease of installation of these systems.

The fastening element is designed to accommodate a different element for holding in place the item and comprises a basic body, provided with a recess on the back that is facing the wall, as well as a filling opening which empties into the latter and is used to insert an adhesive or joining agent between the fastening element and the wall.

To allow air displaced by the adhesive or joining agent inserted into the recess to escape, the fastening element is provided with at least one liquid-permeable or gas-permeable opening which extends from the recess to a different surface of the fastening element and which can accommodate the surplus adhesive or joining agent.

The basic body back which is facing the wall is permeable to liquid and gas, at least in some parts, such that the gas which develops inside the recess during the hardening of the adhesive and joining agent can escape, respectively the volatile binding agents can vaporize, and ambient air can simultaneously reach this adhesive and joining agent, thereby causing this agent to harden and ensure a stable, load-bearing attachment of the fastening means on the wall.

The disadvantage of this type of embodiment of the basic body is that it requires considerable additional structural expenditure and, in particular, also limits the free design of the fastening means.

SUMMARY

It is an object of the present invention to provide a stable, flexibly usable fastening for joining two articles, without requiring any structural interventions in the articles themselves.

The fastening composition according to the invention consists of a mixture of an aerobic adhesive and a hydrophilic substance.

The basic idea of the invention is that by adding the hydrophilic substance to the aerobic adhesive, a fastening composition mixture is created which no longer requires that the surface must be brought into contact with moist ambient air to allow the hardening process to start from this surface. Rather, the hydrophilic substance contained in the mixture, which intermingles with the aerobic adhesive, ensures that the aerobic adhesive contained in the mixture can also harden from the inside out, even if there is no longer any external contact with the moisture-containing ambient air. The moisture, respectively the oxygen, required for the hardening process can be found in the hydrophilic substance itself because the hydrophilic properties of this substance ensure that there is a sufficient amount of moisture for hardening the aerobic adhesive in the mixture which forms the fastening composition.

Since the hydrophilic substances release moisture to the environment or also absorb moisture from the environment, depending on the environmental conditions, the moisture content of the hydrophilic substance may not be high enough, depending on the use, to ensure a complete hardening of the mixture following the mixing with the aerobic adhesive.

High importance must be accorded, however, to the moisture content in the hydrophilic substance, respectively in the mixture containing the hydrophilic substance and the aerobic adhesive. Too much moisture destroys the adhesive bond while too little moisture does not result in a reaction in the aerobic adhesive that is composed in particular of polymers, thereby preventing a hardening.

To obtain the appropriate degree of moisture in the fastening composition according to the invention, moisture is supplied in a measured quantity to the mixture composed of aerobic adhesive and hydrophilic substance. It is particularly advantageous if a measured quantity of moisture is added to the hydrophilic substance before it is mixed with the aerobic adhesive.

Particularly suitable for adding a measured quantity of liquid is a wooden spatula which is used for mixing the components and is first submerged in water or generally into an amount of liquid. The amount of water or generally the amount of liquid which can be absorbed by the spatula represents a measured quantity of liquid that is supplied to the mixture of aerobic adhesive and hydrophilic substance. In that case, the hydrophilic substance can act as moisture buffer which can absorb excess moisture and, if necessary, can release it again. As a result of the mixing operation, the moisture is distributed throughout the total volume of the mixture, thus permitting a complete hardening of the mixture. Alternative to a spatula, other devices can be used for measuring in a quantity of liquid. In principle, encapsulated elements that contain liquid can also be used. These elements burst during the mixing operation and release the liquid to the mixture. The tensile and shearing resistances of the fastening composition according to the invention can be improved by adding the encapsulated elements as well as through the admixture of the hydrophilic substance. In principle, storage granules can also be mixed into the hydrophilic substance for supplying the moisture.

As a result of mixing in the hydrophilic substances, the material hardens considerably faster than is the case with other processes.

Articles can thus be attached with the fastening composition according to the invention, simply by inserting a layer of the fastening composition between the two articles.

The layer of fastening composition can be inserted into optional recesses or openings in the articles and, once the articles are joined, can be in a completely enclosed area, meaning an inside area that is delimited by diffusion-impermeable surfaces and is insulated from the ambient air, wherein this nevertheless results in a secure hardening of the aerobic adhesive and thus a load-bearing connection between articles that can withstand high forces. The fastening composition can furthermore also be applied to flat surfaces. In that case, the fastening composition according to the invention can be used between two diffusion-impermeable surfaces to join these.

For a particularly advantageous embodiment of the invention, the aerobic adhesive is composed of modified silane (MS) polymers.

The hydrophilic substances can in principle be salts. Particularly advantageous is the use of hydrophilic substances in the form of hydrophilic carrier fibers which can be natural fibers or synthetic fibers and are preferably made of cotton. Suitable hydrophilic substances basically are: chalk, flour, expanded clay, galactose, cotton wool, flax, hemp, viscose, cellulose, sea grass, felt or also wood fibers, air-pore filters or in general all actively breathing materials.

One essential advantage of the fastening composition according to the invention is that a precise mixing ratio of aerobic adhesive to hydrophilic substance need not be maintained to ensure the function of the fastening composition according to the invention. To ensure the best possible hardening of the aerobic adhesive, it is simply advantageous if the hydrophilic substance is mixed as homogeneously as possible with the aerobic adhesive.

It is furthermore essential for the use of the fastening composition that the components of the fastening composition are mixed together just prior to the use of the fastening composition.

It is useful in that case to provide a mounting set which comprises two receptacles for the separate storage of the aerobic adhesive and the hydrophilic substance, in particular for the hydrophilic carrier fiber. The individual components can then be removed in the desired amounts from these receptacles for mixing together the fastening composition.

The fastening composition consisting of the individual components can furthermore be mixed together quickly and easily even by untrained personnel because no precise ratios are required for mixing together the aerobic adhesive and the hydrophilic substance.

A further advantage of the fastening composition according to the invention is that it can be used to create a reversible connection between two articles. This is based on the fact that the connection created with the fastening composition between the articles is extremely resistant to tensile forces, but is less resistant to shearing forces. Thus, by turning an article during the removal, the connection created with the fastening composition can be severed once more. The joining locations can subsequently be cleaned by using a spatula or the like for removing residual fastening composition material.

With the process according to the invention, an article is attached to a substrate by using the following process steps:

In a first step, the fastening composition is prepared by mixing together the hydrophilic substance, especially the hydrophilic carrier fibers, and the aerobic adhesive. Following this, a layer of the fastening composition is applied to the article and the article is then attached to the substrate by pressing the fastening composition layer onto the substrate. The aerobic adhesive in this layer subsequently hardens as a result of the moisture contained in the hydrophilic substance.

It is particularly advantageous if a measured amount of liquid is added to the hydrophilic substance prior to mixing together the aerobic adhesive and the hydrophilic substance.

It is a particular advantageously if the substrate is a wall and the article is a fastening element to which an equipment item is attached.

The equipment item in this case is attached to the fastening element once the layer of fastening composition between the wall and the fastening element has hardened. However, equipment items can generally also be attached directly to the wall with the aid of the fastening composition.

According to the invention, the fastening means or element can be attached to the wall without the use of screws and the like, so that no bore holes must be worked into the wall.

As a result, these fastening means can be attached without damaging or impairing the wall.

This type of attachment is particularly advantageous if the wall has a covering consisting of tiles, ceramic tiles or stone slabs or marble slabs to which the fastening element is attached.

Consequently, there is no danger during the fastening process of damaging or impairing the sensitive and typically expensive wall covering.

BRIEF DESCRIPTION OF THE DRAWINGS

The invention is explained in the following with the aid of the drawings, which show in.

DETAILED DESCRIPTION

Figure 1:
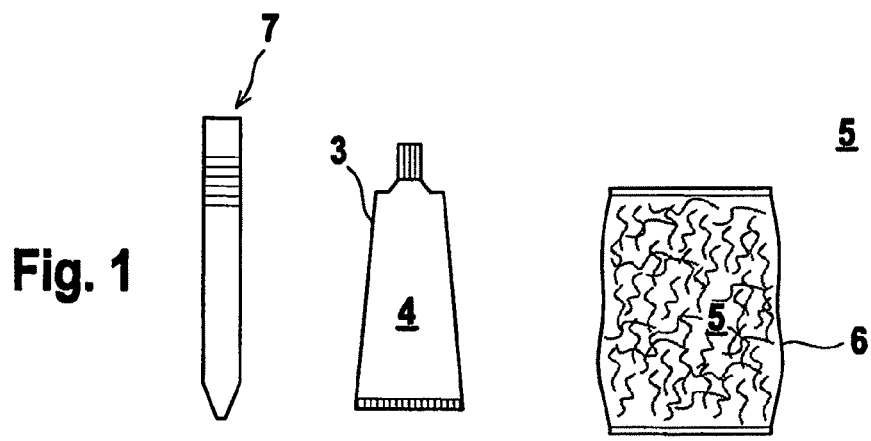
FIG. 1: A schematic representation of a mounting set comprising the components for the fastening composition according to the invention.
Figure 2:
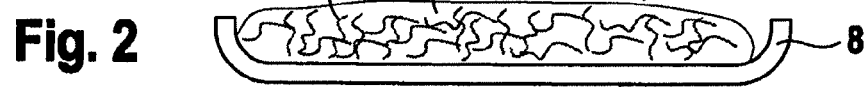
FIG. 2: The fastening composition mixed together inside a container.

FIG. 1 schematically shows a mounting set 1 with the individual components for producing a fastening composition 2, shown in the mixed-together state in FIG. 2.

The mounting set 1 comprises a tube 3 which contains an aerobic adhesive 4. The aerobic adhesive 4 in the present case is composed of modified silane (MS) polymers. The mounting set 1 furthermore comprises an amount of hydrophilic substances which in the present case are hydrophilic carrier fibers 5 that are stored inside a bag 6 or the like. In the present case, non-dried cotton is used for the hydrophilic carrier fiber 5. The mounting set 1 is completed by a spatula 7 and, if applicable, also contains operating instructions which are not shown herein.

The fastening composition 2 is produced by mixing together the components just before it is used for attaching articles, namely by mixing together the aerobic adhesive 4 and the hydrophilic carrier fiber 5. The aerobic adhesive 4 and the hydrophilic carrier fibers 5 are placed for this into a container 8 or a similar container, as shown in FIG. 2, and are then mixed homogeneously with the aid of the spatula 7.

The spatula 7 is preferably made of wood. The spatula 7 is first submerged in water to obtain a moisture content that is suitable for the complete hardening of the mixture. The moisture absorbed by the spatula 7 is then transferred to the hydrophilic substance, whereupon this substance is mixed with the aerobic adhesive 4, using the spatula 7.

The volume share of hydrophilic carrier fibers 5 in the mixture preferably amounts to approximately 30 to 40%, wherein the weight percentage of the hydrophilic carrier fiber 5 in the mixture is in the order of magnitude of 10%.

Immediately after mixing together the components for the fastening composition 2, this composition is used to join two articles.

Figure 3:
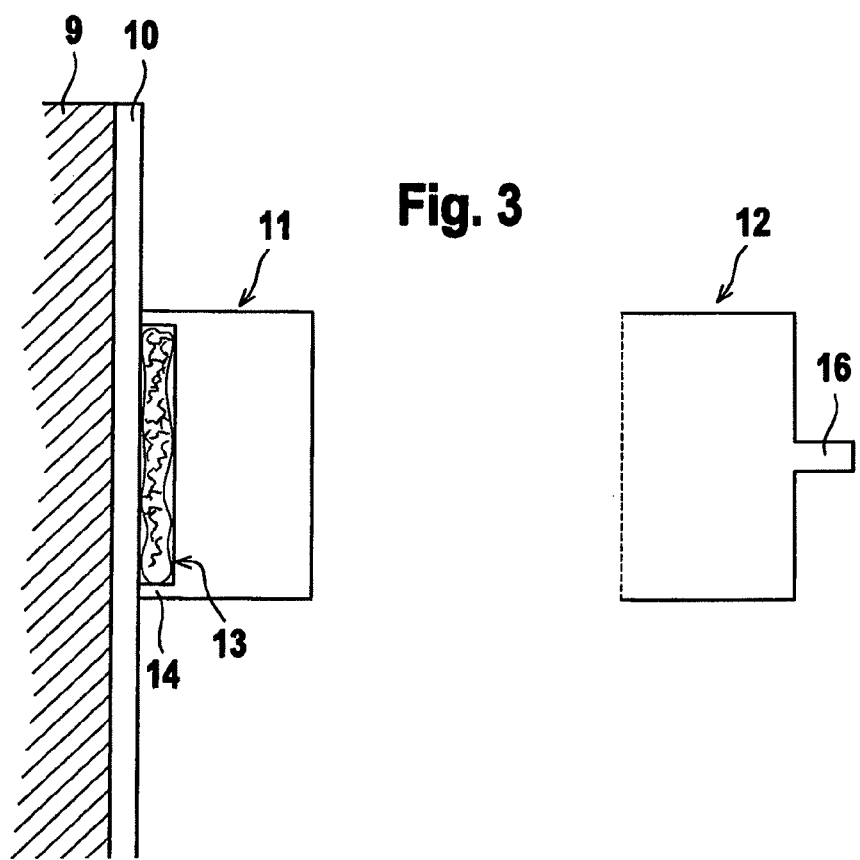
FIG. 3 The fixing of an article to a wall with the aid of the fastening composition according to FIG. 1.

One exemplary embodiment is illustrated in FIG. 3. FIG. 3 shows a segment of a building wall 9, in particular of a room in a house which is provided with a wall covering 10 in the form of tiles.

This wall covering 10 on the wall 9 is to be provided with a fastening element 11 on which subsequently a piece of equipment is to be mounted, in particular a sanitary equipment item such as a towel holder, a shelf, a shower set or the like, wherein several such fastening elements 11 can generally also be provided for attaching an equipment item.

FIG. 3 schematically shows one component of the equipment in the form of a locking element 12 which can be fixed to the fastening element 11.

The fastening element 11 has an essentially circular-disk shaped outline. The underside facing the wall 9 is provided with a recess 13 which is delimited by an edge segment 14 that extends along the complete circumference of the fastening element 11.

With the fastening element 11 removed from the wall 9, for example, the freshly mixed fastening composition 2 that is shown in FIG. 2 is filled into the recess 13 on the fastening element 11 by using the spatula 7, thereby resulting in the forming of a defined, moldable layer for the fastening composition 2.

The fastening composition 2 is then fitted with the layer of the fastening element 11 onto the wall covering 10 of the wall 9. Owing to the fact that the aerobic adhesive 4 in the fastening composition 2 immediately has a certain adhesive force, the fastening element 11, which has only a diameter of a few centimeters and has a low inherent weight, is held securely against the wall covering 10.

Bore holes extending in axial direction and ending in the recess 13 can be provided in the fastening element 11, so as to prevent the fastening composition 2 from escaping on the side from the fastening element 11 while it is fitted against the wall covering 10. Excess fastening composition 2 material can then flow into these bore holes while the element is attached to the wall covering 10.

Even though the fastening composition 2 is contained in a completely enclosed space, following the attachment of the fastening element 11 to the wall covering 10, and does not come in contact with the ambient air, the aerobic adhesive 4 in the fastening composition 2 can harden completely from the inside because of the admixture of the hydrophilic carrier fiber 5 because this hydrophilic carrier fiber 5 has stored the moisture, respectively the oxygen, required for the hardening.

A load-bearing attachment of the fastening element 11 to the wall 9 is obtained as soon as the fastening composition 2 has hardened, so that the equipment item can be attached to the element. In the present case, the locking element 12 is attached with the aid of a screw connection or a plug-in connection to the fastening element 11. The locking element 12 comprises a holding element 16 to which the equipment article can be attached, e.g. a towel holder.

The invention claimed is:

1. A mounting set to produce a fastening composition for attaching two articles, wherein the mounting set comprises two receptacles storing an aerobic adhesive and a hydrophilic substance, respectively, wherein the aerobic adhesive and the hydrophilic substance are removable from the two receptacles to mix together to form the fastening composition, and wherein the hydrophilic substance comprises a hydrophilic carrier fiber including non-dried cotton.

2. The mounting set according to claim 1, wherein the hydrophilic substance includes a measured quantity of moisture.

3. The mounting set according to claim 1, wherein the aerobic adhesive comprises modified silane (MS) polymers.

4. The mounting set according to claim 1, wherein the fastening composition has properties that are pre-determinable by a specified mixing ratio of the aerobic adhesive to the hydrophilic substance.

5. The mounting set according to claim 1, wherein the fastening composition has a breaking point that is pre-determinable by a specified mixing ratio of the aerobic adhesive to the hydrophilic substance.

6. The mounting set according to claim 1, wherein at least one of a basic adhesive force and a hardening speed is pre-determinable with the aid of a specified mixing ratio of the aerobic adhesive to the hydrophilic substance.

7. A process for fixing an article to a substrate with a mounting set comprising two receptacles storing an aerobic adhesive and a hydrophilic substance, respectively, wherein the aerobic adhesive and the hydrophilic substance are removable from the two receptacles to mix together to form the fastening composition, the process comprising the following steps:

initially preparing the fastening composition by mixing together the hydrophilic substance and the aerobic adhesive;

applying a layer of the fastening composition to the article;

subsequently fixing the article to the substrate by pressing the layer of the fastening composition against the substrate, wherein the aerobic adhesive in this layer hardens because of the moisture contained in the hydrophilic substance, wherein the hydrophilic substance comprises a hydrophilic carrier fiber including non-dried cotton.

8. The process according to claim 7, further comprising the step of adding a measured quantity of moisture to the hydrophilic substance before the hydrophilic substance is mixed with the aerobic adhesive.

9. The process according to claim 7, wherein the article comprises a mechanical fastening device.

10. The process according to claim 7, wherein the substrate comprises a wall and the article comprises a fastening element to which a piece of equipment can be attached.

11. The process according to claim 10, wherein the wall includes a wall covering of tiles, ceramic tiles, stone slabs or marble slabs to which the fastening element is attached.

12. The process according to claim 11, wherein the piece of equipment is attached to the fastening element after the layer of the fastening composition between the wall and the fastening element has hardened.

13. The process according to claim 10, wherein the piece of equipment comprises one of a light fixture, a piece of furniture or a sanitary equipment item.

14. The process according to claim 9, wherein the mechanical fastening device comprises one of a pipe clip or an adaptor.

* * * * *